United States Patent [19]

Tani et al.

[11] Patent Number: 4,900,295

[45] Date of Patent: Feb. 13, 1990

[54] BELT TRANSMISSION DEVICE FOR MOTORCAR ENGINES AND AUXILIARY DEVICES

[75] Inventors: Kazuyoshi Tani; Masaki Ochiai, both of Kobe, Japan

[73] Assignee: Bando Chemical Industries, Ltd., Kobe, Japan

[21] Appl. No.: 251,092

[22] Filed: Sep. 29, 1988

[30] Foreign Application Priority Data

Sep. 30, 1987 [JP] Japan .......................... 62-150754[U]
Jun. 6, 1988 [JP] Japan .......................... 63-074894[U]

[51] Int. Cl.$^4$ .......................... F16H 7/02; F16H 5/00
[52] U.S. Cl. .......................... 474/167; 474/242
[58] Field of Search .............. 474/166, 167, 201, 237, 474/242, 265

[56] References Cited

U.S. PATENT DOCUMENTS

| 2,442,037 | 5/1948 | Carter et al. ............ 474/265 X |
| 2,884,797 | 5/1959 | Murray ...................... 474/167 |
| 3,127,780 | 4/1964 | Buhrmann .............. 474/167 X |
| 3,453,900 | 7/1969 | Orndorff, Jr. et al. ..... 474/265 X |
| 3,808,901 | 5/1974 | Berg ........................... 474/265 X |
| 4,465,469 | 8/1984 | Cataldo ..................... 474/242 X |

FOREIGN PATENT DOCUMENTS 60798 5/1939 Norway ........................ 474/265

Primary Examiner—Jerome W. Massie, IV
Assistant Examiner—Matthew Smith
Attorney, Agent, or Firm—Wenderoth, Lind & Ponack

[57] ABSTRACT

In a belt transmission apparatus utilized between an engine of a motorcar and an auxiliary apparatus thereof, a pulley groove angle $\theta$ of V-belt pulleys is set in the range of 45° to 60°, where slip of the belt easily occurs. A belt angle $\alpha$ between both sidefaces of the V-belt is set in the range determined by the inequality $\theta - 7 \leq \alpha \leq \theta$ with respect to the pulley groove angle $\theta$.

6 Claims, 3 Drawing Sheets

BELT TRANSMISSION DEVICE FOR MOTORCAR ENGINES AND AUXILIARY DEVICES

BACKGROUND OF THE INVENTION

1. Field of the Invention

This invention relates to a belt transmission device transmitting engine power of a motorcar to an auxiliary apparatus thereof, and more particularly an improvement in reducing tension speed variations of a friction transmission belt having a so-called wedge effect, such as a V-belt, a V-ribbed belt, and the like.

2. Description of the Prior Art

Generally, in an engine of a motorcar, an auxiliary apparatus such as a water pump, an alternator, and the like is drive by engine power through a belt transmission device. This belt transmission device is provided with a driving pulley mounted on a crankshaft of the engine, a driven pulley mounted on a driving shaft of the auxiliary apparatus, and a V-belt trained between both pulleys, arranged so that the engine power is transmitted to the auxiliary apparatus through the V-belt to drive it.

In the belt transmission device in the engine of the motorcar, there is a problem in that belt life is extremely lowered due to tension variations of the V-belt caused by rotational speed variations of the engine. Particularly in a Diesel engine, large torsion vibrations and displacements in rotation occur at the crankshaft, since the compression ratio of the Diesel engine piston is comparatively larger than that of a gasoline engine. And more particularly, while rotational speed variations are comparatively small in a Diesel engine equipped with a manual speed-shifting gear, owing to a large flywheel, in a Diesel engine equipped with an automatic speed-shifting gear the rotational speed variations can hardly be regulated, since a small flywheel is employed therein. Therefore, large tension variations occur in the V-belt due to these large rotational speed variations. The rotational speed variations are increased especially in a low rotational speed range (650 rpm–1000 rpm), with the result that the life of the V-belt is extremely lowered by an inertia load caused by these rotational speed variations.

In order to decrease the tension variations of the V-belt, a tension pulley is conventionally provided between the driving and driven pulleys to bias the V-belt with a spring, as disclosed in U.S. Pat. No. 3,643,518. The rotational speed variations of the V-belt are to be regulated in the manner that the tension pulley is moved against a bias force of the spring to suppress the increase of the tension when the tension of the V-belt is increased, and the tension pulley is urged in a spring restoring direction by the bias force of the spring to increase the tension when the tension of the V-belt is decreased.

In the abovementioned belt transmission device, conventionally, an efficiency of the transmissibility is regarded as so important that pulley groove angles of the driving or driven pulleys is limited in a range of 35° to 40°, to get a high efficiency of belt transmission. This has great advantages if rotational speed variations of the engine do not occur. However, as mentioned above, in case the large rotational speed variations of the V-belt may occur, especially in a Diesel engine with an automatic speed-shifting gear, the abovementioned tension pulley must be employed.

Moreover, in a conventional device a supporting member for the tension pulley, a spring for biasing the tension pulley and the like must be employed in addition to the tension pulley in order to decrease the tension variations. Therefore, the cost is excessive due to a multiplicity of parts and the complexity of the arrangement.

Moreover, it is extremely disadvantageous to stow such a device in a small engine room of a motorcar, since the device is large-sized.

SUMMARY OF THE INVENTION

This invention has been made in view of above disadvantages, and its objects are to lengthen the life of the V-belt, to simplify its arrangement, and to derive a small-sized device.

This invention is based on a belt transmission device comprising a driving pulley mounted on a crankshaft of an engine of a motorcar, a driven pulley mounted on a driving shaft of an auxiliary apparatus, and a belt trained between the driving and driven pulleys having a pair of inclined sidefaces with a certain angle therebetween to engage with the pulley grooves. To attain these objects, the device is arranged so that each pulley groove angle of the driving and driven pulleys lies in a range of 45° to 60°.

Also, a belt angle $\alpha$ between the sidefaces of the belt lies in a range determined by the following inequality with respect to an angle $\theta$ of each pulley groove.

$$\theta - 7 \leq \alpha \leq \theta$$

According to abovementioned arrangement, in this invention, the power of the engine is transmitted to the auxiliary apparatus to drive it in the manner that the driven pulley is rotated through the belt by the rotation of the driving pulley associated with the crankshaft of the engine.

During this process, the tension variations may occur due to the rotational speed variations of the engine. However, the belt easily slips on the driven pulley to regulate the tension variations of the belt since each pulley groove angle $\theta$ of the driving and driven pulleys lies in a range of 45° to 60°. Therefore, the life of the V-belt is lengthened. Expecially, while the rotational speed variations are comparatively greater in a Diesel engine than in a gasoline engine, the tension variations can be regulated by means of this arrangement. Also, while the rotational speed variations of the engine with an automatic speed-shifting gear may be increased more than that of an engine with a manual speed-shifting gear, these rotational variations can be regulated to keep the life of the belt fairly long.

Moreover, since the tension variations of the belt is regulated only by the increase of the pulley groove angle $\theta$, the conventional tension pulley and spring are not required and the number of the parts can be reduced and the arrangement can be simplified to lower the cost. In addition, it is extremely easy to stow them even in a small engine room of a motorcar, since the whole device can be compact.

The tension variations of the belt are more easily regulated by slipping to provide a long belt life if the angle $\alpha$ between both sidefaces of the belt lies in the range of angle $\theta$, the pulley groove angle, an angle less than $\theta$ to ($\theta - \leq \alpha \leq \theta$).

BRIEF DESCRIPTION OF THE DRAWINGS

The drawings show a embodiment of the present invention, wherein.

DESCRIPTION OF THE PREFERRED EMBODIMENT

An embodiment of this invention is described below, with reference to the drawings.

Figure 1:
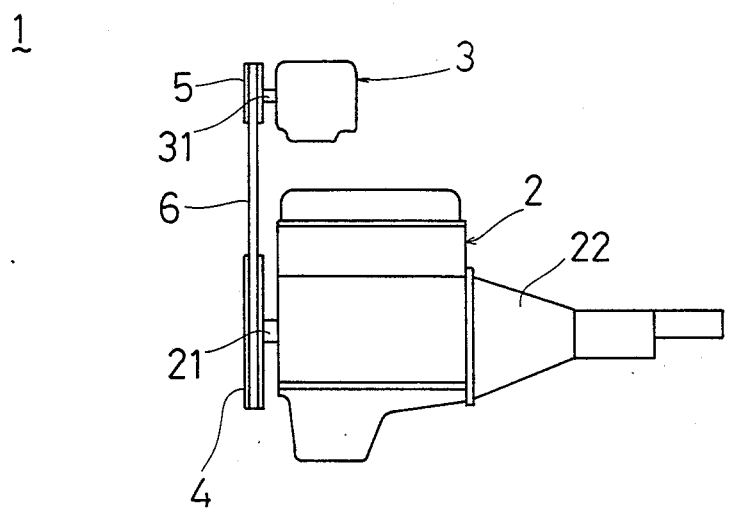
FIG. 1 is a schematic side elevation of the belt transmission device, an engine and an auxiliary apparatus thereof.
Figure 2:
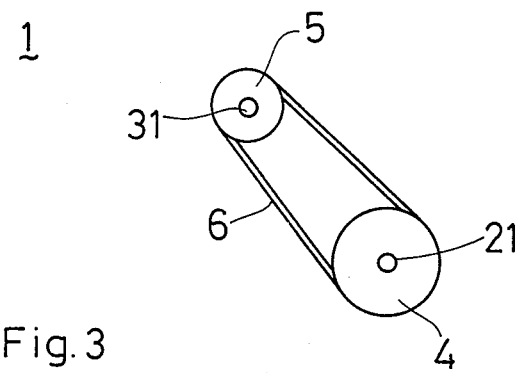
FIG. 2 is a scehmatic illustration of an arrangement of the belt transmission device.
Figure 3:
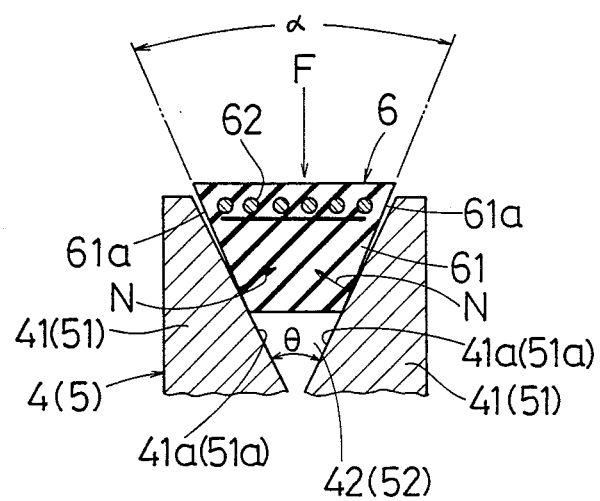
FIG. 3 is a partially sectional view of a pulley groove, having a V-belt therein according to the present invention.

A belt transmission device 1 is, as shown in FIG. 1 and FIG. 2, composed of a driving pulley 4, a driven pulley 5 and a V-belt 6, stowed in an engine room of a motorcar so arranged as to transmit the power of an engine 2 to an auxiliary apparatus 3 to drive the auxiliary apparatus 3.

The engine 2 is a Diesel engine including an automatic speed-shifting gear 22. The driving pulley 4 is mounted on a crankshaft 21 of the engine 2, to be rotated by power of the engine 2 through the crankshaft 21.

The auxiliary apparatus 3 is an alternator, a water pump, an air pump, or the like driven by the power of the engine 2. The driven pulley 5 is mounted on a driving shaft 31 of the auxiliary apparatus 3.

Both the driving pulley 4 and the driven pulley 5 are composed of a pair of discoidal sideplates 41, 41 and 51, 51 facing each other, wherein a pair of confronting sideplate faces 41a, 41a and 51a, 51a thereof are inclined to form V-shaped pulley grooves 42 and 52 therebetween. The V-belt 6 is trained between the driving pulley 4 and the driven pulley 5 engaging with both pulley grooves 42, 52 to transmit the power of the engine 2 to the auxiliary apparatus 3.

The V-belt 6 is provided with a belt body 61 a section of which has an inverted trapezoidal shape in correspondance with the pulley grooves 42, 52, wherein a plurality of tensile cords 62, 62, . . . are embedded therein. Both sidefaces thereof are inclined forming V-shaped power transmitting faces 61a, 61a to engage with the sideplate faces 41a, 41a and 51a, 51a of both pulleys.

Dimensions of a pulley groove angle $\theta$ and a belt angle $\alpha$, as characteristics of this invention, are described.

In the driving pulley 4 the pulley groove angle between both sideplate faces 41a, 41a is determined in the range of 45° to 60°. In the driven pulley 5 the pulley groove angle between both sideplate faces 51a, 51a is also determined in the range of 45° to 60°. The belt angle $\alpha$ between the power transmitting faces 61a, 61a of the V-belt is determined so as to be adapted to the pulley groove angles $\theta$ as mentioned hereafter.

The reason why the pulley groove angle $\theta$ should lie in the range of 45° to 60° is now described.

Figure 4:
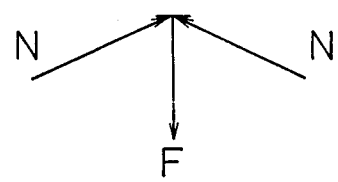
FIG. 4 is a diagram showing vectors of forces applied to the V-belt of FIG. 3.

With respect to the driven pulley 5, owing to a tension T applied to the V-belt when trained to the driven pulley 5, the V-belt 6 is compressed to the driven pulley 5 under a compressive force F. Against the compressive force F, as shown in FIG. 4, a reaction force N is applied to the V-belt 6 at the power transmitting face 61a from each the sideplate surface 51a, 51a. The relation between the compressive force F and the reaction force N is expressed in the following formula.

$$N = (\tfrac{1}{2}) \cdot F \cdot \{1/\sin(\theta/2)\} \quad (1)$$

Then, a friction force Fa affects under the reaction force N between each the power transmitting face 61a, 61a of the V-belt 6 and each the sideplate surface 51a, 51a of the driving pulley as expressed in the following formula, whererin reference $\mu$ designates a coefficient of friction.

$$Fa = 2N \cdot \mu \quad (2)$$

The power of the engine 2 is transmitted to the driven pulley 5 through the V-belt under this friction force Fa.

Figure 5:
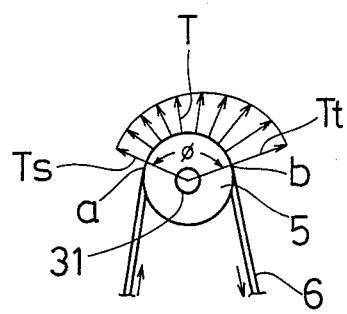
FIG. 5 is a diagram showing the change in the tension applied to the V-belt.

As shown in FIG. 5, with respect to a contact angle $\phi$ between the V-belt 6 and the driving pulley 5, the relation between the tension T of the V-belt 6 and the compressive force F is expressed in the following formula.

$$F = \int_a^b T \cdot d\phi \quad (3)$$

The tension T is increased from the Value Ts at a slack part to the value Tt at a tight part, as shown in FIG. 5.

A tension ratio K defined by the formula below lies in the range expressed in the following inequality, wherein reference Tc designates an initial tension of the V-belt.

$$K = (Tt - Tc)/(Ts - Tc) \leq \exp[\mu \cdot \{1/\sin(\theta/2)\} \cdot \phi] \quad (4)$$

According to the formula (4), the more the pulley groove angle $\theta$ decreases, the larger tension ratio K the V-belt 6 can hold in to improve a transmissive power, namely, a belt transmissibility.

Both tensions Tt, Ts are calculated with respect to the pulley groove angle $\theta$ based on the formula (4), as shown in Table 1.

TABLE 1

| force/angle $\theta$° | 35 | 40 | 45 | 50 | 55 | 60 |
|---|---|---|---|---|---|---|
| Tt | 34.2 | 33.1 | 32.1 | 31.2 | 30.4 | 29.8 |
| Ts | 5.8 | 6.9 | 7.9 | 8.8 | 9.6 | 10.2 |
| P | 28.4 | 26.2 | 24.2 | 22.4 | 20.8 | 19.6 |

Wherein $Tt + Ts = 2T = 40$ kg·f apparent coefficiency of friction $\mu = 0.17$
$\phi = \pi$
$Tc \approx 0$
P = transmitted rotational power (effective tension)

According to Table 1, the transmitted rotational power P decreases in accordance with increase of the pulley groove angle $\theta$. Namely, the slip of the V-belt 6 on the driven pulley 5 may easily occur when the pulley groove angle $\theta$ is set in the range of 45° to 60°. Therefore, the tension variations of the V-belt 6 are regulated by the slip of the V-belt 6 on the driven pulley 5.

Figure 6:
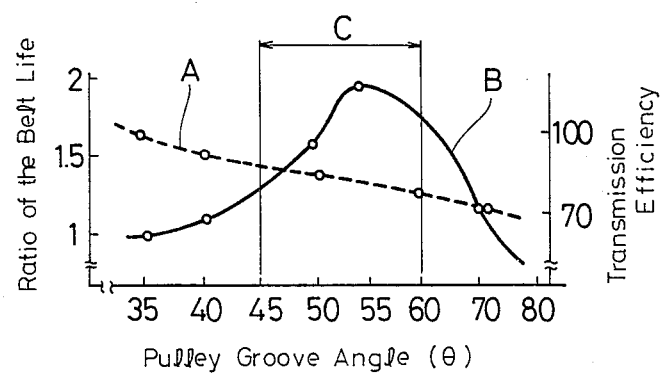
FIG. 6 is a graphical representation illustrating the transmission efficiency and a ratio of the belt life with respect to the pulley groove angle.

Next, test results of the life and transmissibility of the V-belt 6 with respect to the pulley groove angle $\theta$ are described with reference to FIG. 6. The test was done under the condition where a diameter of the driving pulley 4 is 140 mm; a diameter of the driven pulley 5 is 75 mm; a rotational speed of the crankshaft 21 is 700 rpm; and a percentage of the rotational speed variations of the crankshaft 21 is in the range of ±20% to ±30%. In FIG. 6, while the efficiency of the transmissibility shown by a broken line (A) gradually decreases depending on the increase of the pulley groove angle $\theta$ (see the formula (4)), the belt life shown by a full line (B) increases abruptly near 45° of the pulley groove angle $\theta$, reaching the maximum value at 55°, and then falls therefrom. Namely, as mentioned above, the slip of the V-belt 6 easily occurs on the driven pulley 5 in accordance with the increase of the pulley groove angle $\theta$ (see Table 1) with the result that the tension variations caused by the rotational speed variations of the engine 2 is decreased by the slip to lengthen the life of the V-belt 6. However, when the pulley groove angle $\theta$ reaches above 60°, the belt life is lowered due to the generation of the heat caused by the slip. Therefore, the pulley groove angle $\theta$ should lie in the range (C) of 45° to 60°.

On the other hand, the belt angle $\alpha$ of the V-belt 6 with respect to the pulley groove angle $\theta$ lies in the range determined by the following inequality (5).

$$\theta - 7 \leq \alpha \leq \theta \quad (5)$$

Namely, belt angle $\alpha$ lies in the range of the same value as the pulley groove angle $\theta$, but just less than angle $\theta$.

Figure 7:
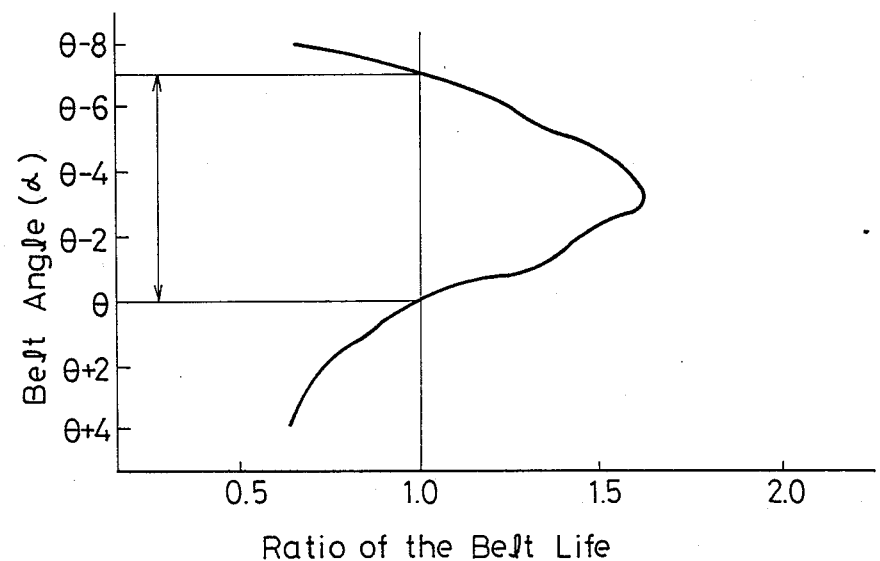
FIG. 7 is a graphical representation illustrating the ratio of the belt life with respect to the belt angle.

Test results of the life of the V-belt with respect to the belt angle $\alpha$ is described, with reference to FIG. 7. The test was done under the condition where the diameter of the driving pulley 4 is 140 mm; the diameter of the driven pulley 5 is 75 mm; the rotational speed of the crankshaft 21 is 700±50 rpm; the initial tension Tc is 140 lbs; and a four-cylinder Deisel engine 2 is utilized.

FIG. 7 shows the change of the life ratio of the V-belt with respect to the change of the belt angle $\alpha$, defining a life ratio of the V-belt 6 is 1.0 when the belt angle $\alpha$ is equal to the pulley groove angle $\theta$. When the belt angle $\alpha$ is changed from a rather larger angle than the pulley groove angle $\theta$ to a smaller angle, life ratio of the V-belt 6 gradually increases and reaches a maximum value near the point where the belt angle $\alpha$ is 3° smaller than the pulley groove angle $\theta$, and drops. The belt angle $\alpha$ is favorably set in the range of the same angle as the pulley groove angle $\theta$ to 7° smaller than the pulley groove angle $\theta$.

In the abovementioned belt transmission device 1, when the engine 2 is operating, the power of the engine 2 is transmitted to the auxiliary apparatus 3 to drive it in the manner that the driven pulley 5 is rotated through the V-belt 6 by the rotation of the driving pulley 4 associated with the rotation of the crankshaft 21.

During this process, large torsion vibrations and displacement in rotation occur at the crankshaft 21 in the Diesel engine 2, since the compression ratio of the piston is comparatively larger than that of gasoline engines. Moreover, severe rotational speed variations occur in the engine with the automatic speed-shifting gear, since the flywheel is small. Even though the tension T of the V-belt 6 is varied by these rotational speed variations, the V-belt 6 slips on the driven pulley 5 to regulate the tension variations since the pulley groove angle $\theta$ lies in the range of 45° to 60° and the belt angle $\alpha$ with respect to the pulley groove angle $\theta$ lies in the range determined by the inequality $\theta - 7 \leq \alpha \leq \theta$. Therefore, an almost constant tension is always applied to the V-belt.

As shown in FIG. 6, though the transmission efficiency is slightly lowered compared with the conventional device, the belt life can be greatly lengthened since the tension variations are regulated by the slip.

Moreover, since the life of the V-belt can be lengthened only by the increase of the pulley groove angle $\theta$, a conventional tension pulley, a spring, and the like are not required, the number of parts can be lessened, and the arrangement can be simplified to lower the cost.

Moreover, it is extremely easy to stow them even in a small engine room of a motorcar since the whole device can be compacted.

In this embodiment, the device using the Diesel engine 2 is described. Nevertheless, this invention can be applied to the gasoline engine or an engine with a manual speed-shifting gear as well as automatic speed-shifting gear engine. Consequently, the device of this invention can be applied to an engine of a motorcar in which rotational speed variations occur, particularly, to a Diesel engine where rotational speed variations are greater than that of gasoline engines, and to a automatic speed-shifting gear where rotational speed variations are greater than that with a manual speed-shifting gear. The more rotational speed variations occur, the more remarkable advantages the device derives.

In this embodiment, the pulley groove angles $\theta$ of both driving and driven pulleys have the same value. Nevertheless, they can be set at different values with respect to each other. This invention can be also applied to a belt having circular belt grooves between two sidefaces 61a, 61a, i.e. a so-called V-ribbed belt.

INDUSTRIAL APPLICABILITY

The device of this invention is effectively utilized in an engine of a motorcar as a belt transmission device between the engine and the auxiliary apparatus, i.e. an alternator, a water pump, an air pump, or the like, where the tension variations of the belt occur due to the rotational speed variations of the pulleys.

We claim:

1. A belt transmission device for use in an engine of a motorcar, said belt transmission device comprising:
    a driving pulley for mounting on a crankshaft of an engine, said driving pulley having a first V-shaped pulley groove with a first pulley groove angle $\theta$ of 45°-60°;
    a driven pulley for mounting on a driving shaft of an auxiliary device of the engine, said driven pulley having a second V-shaped pulley groove with a second pulley groove angle $\theta$ of 45°-60°; and
    a belt trained between said driving pulley and said driven pulley, said belt having a pair of inclined sidefaces in a V-shape, said inclined sidefaces having a predetermined angle therebetween, to engage said V-shaped pulley grooves of said driving pulley and said driven pulley.

2. The belt transmission device as set forth in claim 1, wherein:

said predetermined angle of said inclined sidefaces of said belt is an angle $\alpha$, said angle $\alpha$ and both said angles $\theta$ chosen such that the inequality $$\theta - 7° \leq \alpha \leq \theta$$

is satisfied for both said angles $\theta$.

3. A belt transmission device for a diesel engine and an auxiliary device to be driven by the diesel engine, said belt transmission device comprising:
- a driving pulley mounted on a crankshaft of the engine, said driving pulley having a first V-shaped pulley groove with a first pulley groove angle $\theta$ of 45°–60°;
- a driven pulley mounted on a driving shaft of the auxiliary device of the engine, said driven pulley having a second V-shaped pulley groove with a second pulley groove angle $\theta$ of 45°–60°; and
- a belt trained between said driving pulley and said driven pulley, said belt having a pair of inclined sidefaces in a V-shape, said inclined sidefaces having a predetermined angle therebetween, to engage said V-shaped pulley grooves of said driving pulley and said driven pulley.

4. The belt transmission device as set forth in claim 3, wherein:
said predetermined angle of said inclined sidefaces of said belt is an angle $\alpha$, said angle $\alpha$ and both said angles $\theta$ chosen such that the inequality $$\theta - 7° \leq \alpha \leq \theta$$

is satisfied for both said angles $\theta$.

5. A belt transmission device for a diesel engine having an automatic speed-shifting gear and an auxiliary device to be driven by the diesel engine, said belt transmission device comprising:
- a driving pulley mounted on a crankshaft of the engine, said driving pulley having a first V-shaped pulley groove with a first pulley groove angle $\theta$ of 45°–60°;
- a driven pulley mounted on a driving shaft of the auxiliary device of the engine, said driven pulley having a second V-shaped pulley groove with a second pulley groove angle $\theta$ of 45°–60°; and
- a belt trained between said driving pulley and said driven pulley, said belt having a pair of inclined sidefaces in a V-shape, said inclined sidefaces having a predetermined angle therebetween, to engage said V-shaped pulley grooves of said driving pulley and said driven pulley.

6. The belt transmission device as set forth in claim 5, wherein:
said predetermined angle of said inclined sidefaces of said belt is an angle $\alpha$, said angle $\alpha$ and both said angles $\theta$ chosen such that the inequality $$\theta - 7° \leq \alpha \leq \theta$$

is satisfied for both said angles $\theta$.

* * * * *